US008527499B2

(12) United States Patent
Beringer et al.

(10) Patent No.: US 8,527,499 B2
(45) Date of Patent: Sep. 3, 2013

(54) COMPUTER IMPLEMENTED METHOD AND SYSTEM FOR A USER SEARCH INTERFACE

(75) Inventors: Joerg Beringer, Frankfurt (DE); Sandra Nieves, Karlsruhe (DE)

(73) Assignee: SAP AG, Walldorf (DE)

( * ) Notice: Subject to any disclaimer, the term of this patent is extended or adjusted under 35 U.S.C. 154(b) by 1388 days.

(21) Appl. No.: 11/185,222

(22) Filed: Jul. 19, 2005

(65) Prior Publication Data

US 2006/0026145 A1    Feb. 2, 2006

(30) Foreign Application Priority Data

Jul. 19, 2004   (EP) ..................................... 04016963
Jul. 19, 2004   (EP) ..................................... 04016968

(51) Int. Cl.
*G06F 7/00* (2006.01)
(52) U.S. Cl.
USPC ........................................................ 707/713
(58) Field of Classification Search
USPC ................. 707/10, 3, 713; 709/330
See application file for complete search history.

(56) References Cited

U.S. PATENT DOCUMENTS

| 6,571,245 | B2 * | 5/2003 | Huang et al. ..................... 707/10 |
| 6,601,103 | B1 * | 7/2003 | Goldschmidt Iki et al. .. 709/231 |
| 2002/0063734 | A1 * | 5/2002 | Khalfay et al. ................ 345/744 |
| 2003/0011634 | A1 * | 1/2003 | Hasha et al. ................... 345/762 |
| 2003/0088715 | A1 * | 5/2003 | Chaudhuri et al. ........... 709/330 |
| 2003/0220917 | A1 * | 11/2003 | Copperman et al. .............. 707/3 |
| 2004/0034497 | A1 * | 2/2004 | Shah et al. ..................... 702/127 |
| 2005/0256956 | A1 * | 11/2005 | Littlefield et al. ............. 709/225 |

FOREIGN PATENT DOCUMENTS

EP    1246079 A2    10/2002

OTHER PUBLICATIONS mySAP.com Workplace, Enterprise Portal, "Personalization and Roles", pp. 1-25, XP-002343086, Walldorf Germany, 2000.

* cited by examiner

*Primary Examiner* — Truong Vo
(74) *Attorney, Agent, or Firm* — Blakely, Sokoloff, Taylor & Zafman

(57) ABSTRACT

A computer implemented method for providing a user interface, the method including: providing an interface generator for generating a user interface, the user interface allowing a user to perform a search within a business object or within business objects in a business situation, using a combination of searching using one or more key words and browsing in accordance with predefined options.

4 Claims, 12 Drawing Sheets

COMPUTER IMPLEMENTED METHOD AND SYSTEM FOR A USER SEARCH INTERFACE

CROSS REFERENCE TO RELATED APPLICATIONS

This application claims the benefit of priority from European Application No. EP 04016963.3, filed on Jul. 19, 2004.

TECHNICAL FIELD

Embodiments of the invention generally relate to the field of computer operations and, more particularly, to user interfaces for searches.

BACKGROUND

User interfaces for searches are known. It has been found that conventional searches have a limited usefulness as a means to find and access information because searching within an enterprise conventionally yields results mostly unrelated to what a user is doing at a particular time. Using such a conventional search, the user is forced to review longs lists and go through one or multiple rounds of refinement to finally arrive at what he was looking for.

It is desirable to be able to tailor a search to reflect the user's actual needs, for example, based on what a user is doing at the particular time of the search.

SUMMARY

An embodiment of the invention provides for a computer implemented method for providing a user interface, the method including: providing an interface generator for generating a user interface, the user interface allowing a user to perform a search within a business object or within business objects in a business situation, using a combination of searching using one or more key words and browsing in accordance with predefined options.

BRIEF DESCRIPTION OF THE DRAWINGS

Embodiments of the invention are illustrated by way of example, and not by way of limitation, in the figures of the accompanying drawings in which like reference numerals refer to similar elements:

FIGS. 7-16 illustrate examples of a user interface for a look up action according to embodiments of the present invention.

DETAILED DESCRIPTION

Figure 1:
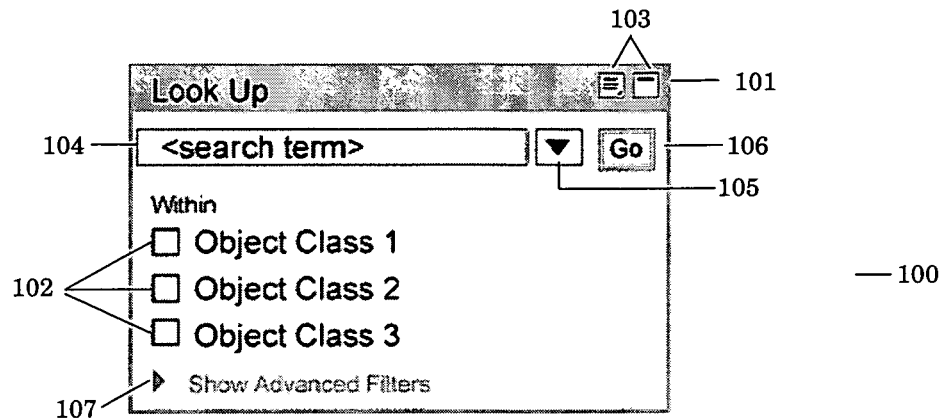
FIGS. 1-6 illustrate examples of a user interface for a contextual search action according to embodiments of the present invention.

There is provided according to a first aspect of the invention, a computer implemented method for providing a user interface, the method including: providing an interface generator for generating a user interface, the user interface allowing a user to perform a search within a business object or within business objects in a business situation, using a combination of searching using one or more key words and browsing in accordance with predefined options.

By combining a search and browse function improved search results are achieved. In particular, search results more closely related to the current activities of the user are found.

In an embodiment, the user interface displays a plurality of instantiated contexts including an active context related to the business situation, and the method is restricted the search range to the active context.

In this way, by introducing the method of contextual search, which restricts a search range to the current context, meaningful results are yielded naturally. By introducing the method of contextual search, which restricts a search range to the current context, meaningful results are yielded naturally. It allows direct access to object classes, displaying favorites and recently used instances by clicking on an object class' link in the launcher, for example, the contextual panel search component. Further, looking up individual items, previously saved queries, or static search result lists can also be done from within the contextual panel's search component. In particular, the search or look up template combines accessing, refining and browsing through information. Further, contextual search or look up restricts the search range to a given context and allows direct access to object classes. Restriction of the search can be done directly in the launcher, for example, the contextual panel search component, as well as in the look up action's user interface, which offers guided navigation and advanced options to help the user to quickly obtain the desired results. In other words, in this way a computer system is provided having a user interface for displaying a plurality of contexts, and a search module, wherein the search module searches based on the active context provided by the user interface, wherein the search range is restricted in accordance with the active context. In this way, in an enterprise wide search, depending on the active context, it is possible to carry out for example, the following search options: one permanent quick search, a search across structured and unstructured items, find everything that exists in the company, search either within the company or outside the company, for example, on the internet, search different repositories, search across all available object types, display results in a new window so as not to interfere with other work.

According to a second aspect of the invention, there is provided a user terminal comprising means operable to perform the method described above.

According to a third aspect of the invention, there is provided a computer readable storage medium storing a program which when run on a computer controls the computer to perform the method described above.

Although a core idea of enterprise search is to include all resources that exist in a company into the search, the possibility of restricting the search range according to the context increases the precision of the search and thereby enhances the user productivity. For example, the user is able to select entry points into repositories to restrict a search, select media types, for example, technical reports, minutes, sales material, select collaborative information space, for example teams, communities, personal best of, select organizational units, select the internet or the company or search within an object. In a contextual search, the user is able to search within the current context, uses a search entry component in the contextual panel, display results in-place in the a content area located, preferably adjacent the contextual panel. Within an activity, it is possible for example, to only look for specific object types, only look for specific media types or only search on specific repositories. Within a work instance, for example, an object or a process, it is possible for example, to only search within direct properties of instance, search within direct properties and within directly related objects or search for any related information.

The user interface may be a natural language interface. The user may input any natural phrase as a search or lookup query.

By providing a context restricted search or look up service as an action, guided navigation for refining a search result based on dynamic filters is achieved.

In one embodiment of the present invention, an enterprise link may be provided. Such a link provides a link in a persistent tool bar in the user interface. The link further launches an enterprise wide loop up action in a new browser window.

In a further embodiment, an enterprise search action is provided. The enterprise search action has the same user interface elements for displaying the search results as the contextual search action, which is described in more detail below.

Before displaying the search results the user specifies his search term. In addition, the user may narrow down the search criteria using guided navigation or advanced filters.

When using guided navigation, selecting a specific repository as the search range is not displayed to the user, as such. Instead, a repository specific variant of an object class is preferably available for the user to choose. Thus, the highest entry point into drilling down into refining the search by categories is preferably, the object class. Thus, the user can define the search by selecting from the available repositories, selecting at least one object class, selecting at least one attribute type, selecting at least one attribute value. Whereupon hitting the go button triggers the search. The search results are displayed as a stacked action. The format of the search results is equivalent to the search within an activity context.

With reference to FIGS. 1 to 6, which illustrate examples of a user interface for a contextual search embodiments according to the present invention. The user interface for the contextual search typically includes a contextual panel search component 100. The contextual panel search component forms part of the Contextual Panel concept and provides quick links and quick text search within an active context. This component is not the search service itself but rather is the launcher to the search service. It may include additional links that are related to accessing and retrieving information.

For example, FIG. 1 shows a user interface of the search component element which may be used for searching within an activity. In particular, it shows a look up Component of a Work Center. The Component containers of the Contextual Panel 100 include a header 101, personalize options 102, and a collapse/expand mechanism 103. The contextual panel further includes an entry field 104 and drop down menu 105 with a "Go" button 106. The personalize options may include a selection of object classes to restrict the range. The panel may further include object class links to display favorite instances of the object class. The panel may also include a show/hide advanced filters option 107. If no object class is selected, the advanced filters will be shown as being unavailable, for example, displayed in grey, as shown in FIG. 1.

Figure 2:
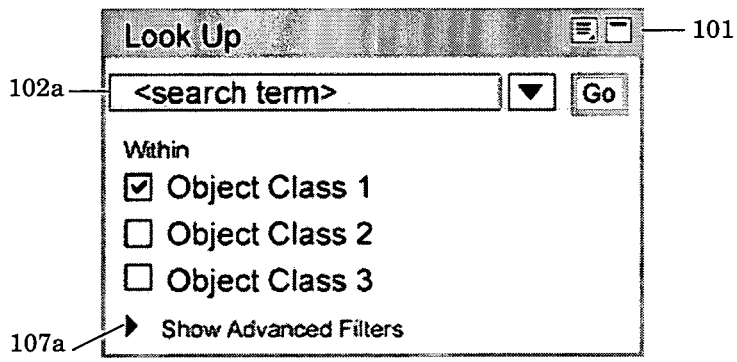
Figure 3:
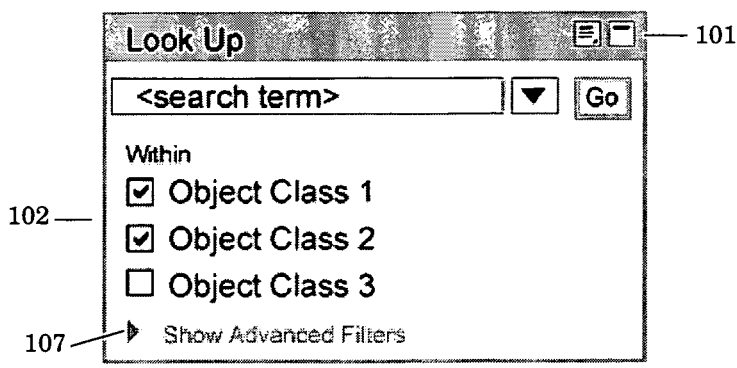

In FIG. 2, in the contextual panel 100, the user has selected an object class 102a, in particular, object class 1. It is seen that when an object class is selected the show/hide advanced filters 107a are shown to be available. For example, they are shown in a non-grayed out fashion. In FIG. 3, in the contextual panel 100, the user has selected two object classes 102, object class 1 and 2. In this situation, it is seen that the show/hide advanced filters 107 are unavailable, if such multiple object classes are selected.

Figure 4:
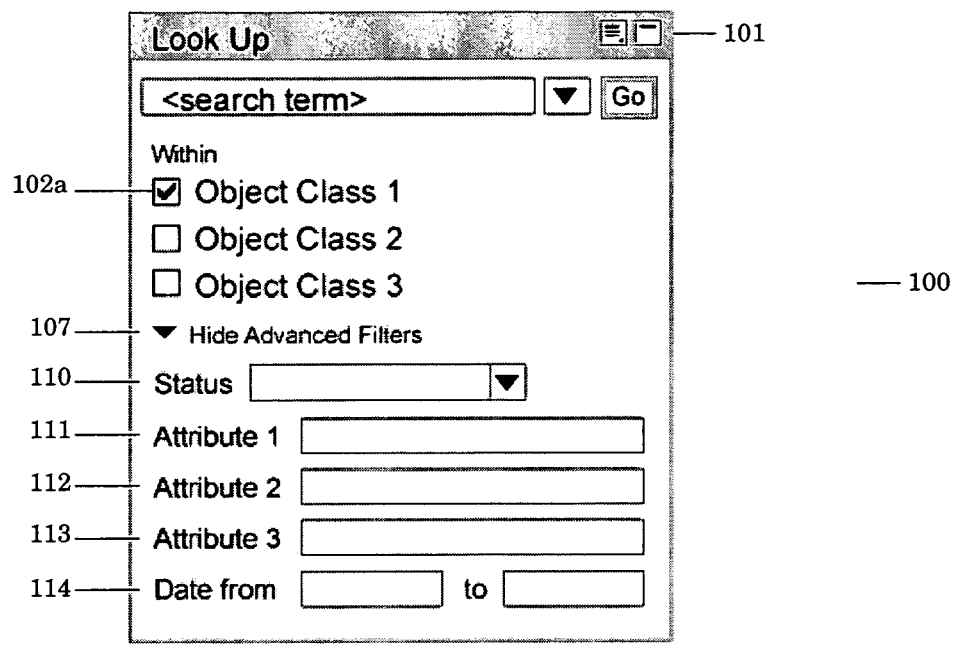

FIG. 4 shows a Look Up Component of a Work Center with the advanced filters 107 shown. The advanced filters 107 may comprise inter alia, a status bar 110 with access to a saved queries/results list, an attribute 1 111, an attribute 2 112, an attribute 3 113 and a date range specifier 114.

Figure 5:
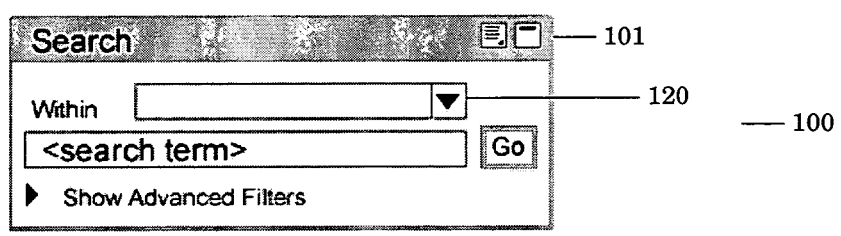

FIG. 5 shows a search of a Work Center with the access to a saved queries/results list 120 to select the object classes. In particular, the saved queries/results lists may be a pop-over menu. The pop over trigger control may say, for example, "Saved Searches", and the icon, for example, the triange icon would bring up a pop up menu with the list of saved search queries.

Figure 6:
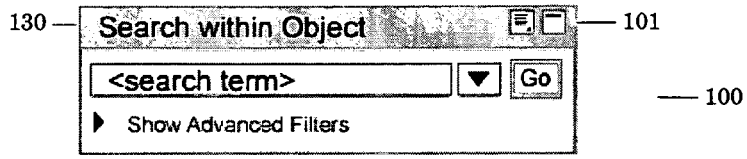

FIG. 6 shows an example of a user interface including a contextual panel 100 for searching within an object instance 130. In particular, it shows a search component within an object's contextual panel. The search is limited in this case to the one object class.

Herein below the contextual panel search component elements and their behavior is described with reference to FIGS. 1 to 6.

In the title area 101, 130, the name of the component is displayed in the title and varies depending on the context. In the context of an activity it is called "Look Up" or "Search". In the context of an instance of a business object it is called "Search within <Name of Object>". On the title area there are also provided the triggers 103 to personalize or collapse/expand the component.

To personalize display of object classes: during design time the application designer assigns object classes to a specific context. In addition, s/he defines which ones are displayed by default. The user can then—during runtime—personalize which of the defined object classes that are being displayed in his contextual panel search component 100.

To personalize advanced options: out of a given set of searchable attributes the user can personalize which ones should to be displayed when opening the advanced options 107 in the contextual panel search component 100.

To personalize queries: using the personalization dialog the user can define and save search queries that suit his/her individual needs. This means defining a personalized set of attributes 111-113 when searching a given object class 102a. This option can be turned on/off by the user.

To show related: selecting this option shows related information to the search.

To select object classes or media types: to a given Work Center certain object classes or media types are assigned at design time. In the contextual panel search component 100 these object classes or media types are displayed as a link list with check boxes, or alternatively in a drop down menu. Selecting one or more of the object classes or media types, in one embodiment, may restrict the search to within that range. If a plurality of object classes are selected, the advanced filters preferably only contain co-attributes. Thus, selecting a plurality of object classes does not necessarily make the advanced filter unavailable. Thus, in an alternative embodiment, the advanced filter is available when a plurality of object classes is selected.

When searching within an object instance the selection of object classes or media types is disabled, as the object instance specifies the range to search within. The search may be made in structured data. Additionally or alternatively, the search may be made in unstructured data.

In one embodiment, the entry field in the lookup component automatically searches the most relevant attributes of an object type. The relevancy of the attributes may be defined by the application designer/solution management.

The object class links 102, 102a function so that when clicking an object class link, it launches the Look Up Action in the content area showing a list of favorites of that object class. It does not trigger a search, but rather serves to look up instances of that object class.

When searching within an object instance there are preferably no object class links available.

The entry field 104, 105 is a combination of free text entry 104 and drop down 105. As a free text entry 104 it can be used to specify a search term in combination with or without having selected an object class 102 or media type. If nothing has been selected, the search is done across all object classes 102 and media types of the Work Center. In the drop down 105 previously saved search results can be accessed.

Hitting the "Go" button 106 triggers the search. By default only the main attribute set of an object class is searched, so that the search result yields a meaningful result. When selecting more then one object class 102, the main attributes of each object class is being searched for the specified term.

The "Go" button 106 is preferably located behind the entry field 104, 105.

Advanced options 107 may also be provided. For example, the contextual panel search component 100 may also include the option of manually entering values for a selection of advanced options offered. This selection might be personalized by the user, see above. The selection of advanced options 107 is limited to space available in the contextual panel. To access the advanced options 107 the user uses the open/close mechanism for the contextual panel search component to expand and display the advanced options. The advanced options—displayed upon clicking on the open/close mechanism or the name—vary with the selected object class. If no object class has been selected the advanced options are disabled.

Further, due to fact that co-attributes can not be assessed across multiple object classes the "Advanced Options" 107 are disabled, if more than one object class 102 has been selected.

When selecting multiple object classes of a Work Center the advanced options offers only the co-attributes to the selected object classes. If there are no common options, "Show Advanced Options" is disabled.

Further optional additional links may be added to the contextual panel search component to launch specialized search tools, or to allow quick look up of user defined queries. For example, a specialized search tool: An optional link to open a specialized search tool may also be part of the CP Search Component. This launches a full-screen application in a new browser window. Further user defined queries may be provided. When specifying personal search queries the contextual panel search component displays them as links. Clicking on one of those links triggers the search.

The contextual panel search component has the following functional behavior: it launches the LookUp Action or other search tools. Further, when text is entered in the entry field 104 and the GO button 105 is clicked, the active context is searched within. Further, by selecting an object type any subsequent text search is restricted to that object type. Yet further, clicking on a object type label launches the LookUp Action restricted to this object type but without any search. Further, optional additional links may launch advanced search application or other application.

The configuration parameters may be arranged to have, but is not restricted to the following flavors: quick search, quick search with object type lookup/filters, show related and show within. The title of the component may be, e.g. lookup, search within, show related, etc. The object/media type list may include 1-10 object types displayed as lookup shortcuts. Alternatively, they may be shown as shortcuts or as dropdown menu. The text field may be shown or hidden. The optional links may include, inter alia, "Advanced Search", Show Related Information, other resources, for example, service directory view with list of on line directories that can be used to look things (Who is Who, Company Address book, Marketplace, . . . ) and personal search queries. The advanced options may include a definition per object class or media type.

The personalization may include, for example, editing to add/remove object classes or media types, add/remove advanced search attributes, add/remove standard queries as shortcuts and to define a default search range.

The purpose of the lookup action is now discussed. The look up action is a WDP component that is implemented as a simple action. It is launched in place within the service container of a contextual floor plan when the user clicks on the "Go" button 105 of the Search Component within the Contextual Panel. The LookUp Action provides all functionality for accessing and retrieving items. Although search is the primary use case there is also functionality to access recent and favorite resources. Adding and managing personal collections is another use case.

FIGS. 7-16 illustrate examples of the user interface for the look up action according to an embodiment of the present invention.

Figure 7:
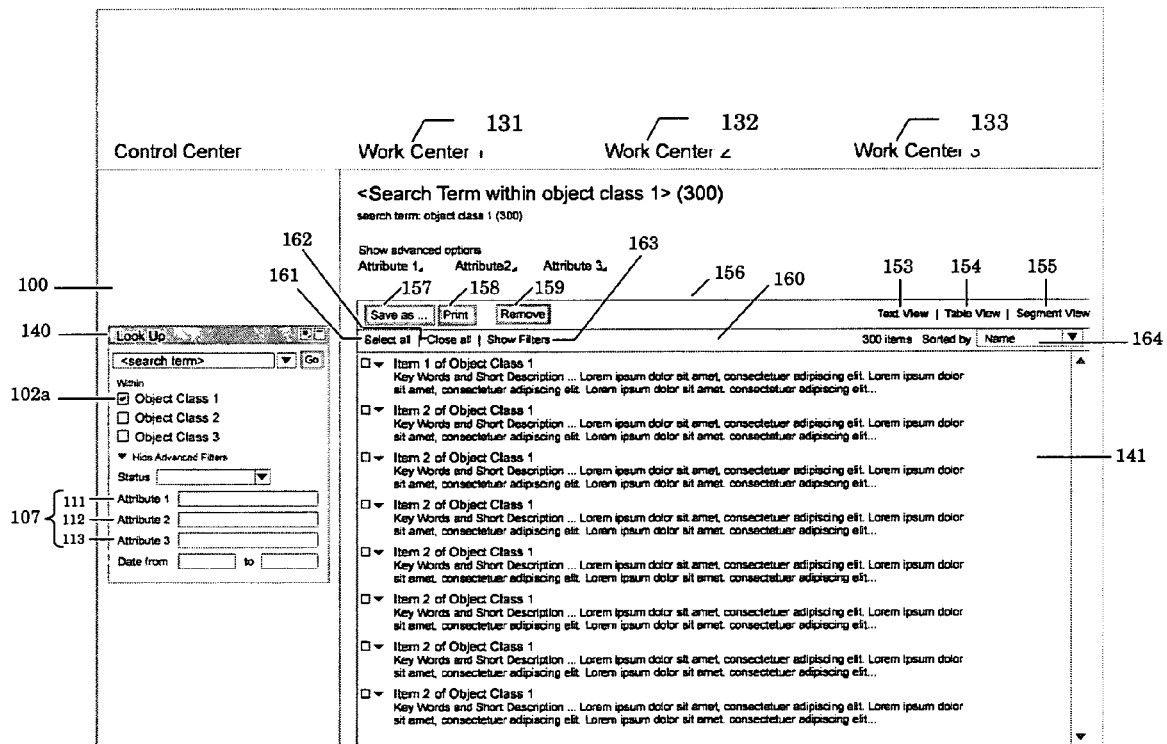

FIG. 7 illustrates a Look Up Action 140 showing the search result list 141 of one object class 102a in text view. If only one object class 102a is selected the refinement options using Guided Navigation are displayed by default and can be toggled to refine using the advanced options 107. Selecting an attribute 111, 112, 113 triggers the refinement of the list. In one embodiment, the refinement options are displayed permanently. In an alternative embodiment, they open on demand. It is noted that when clicking on the URL the object is being displayed the way its application renders it. Further, work centers 1, 2 and 3 131, 132, 133 are shown. At each work center 131, 132, 133 different work can be carried out by the user.

Figure 8:
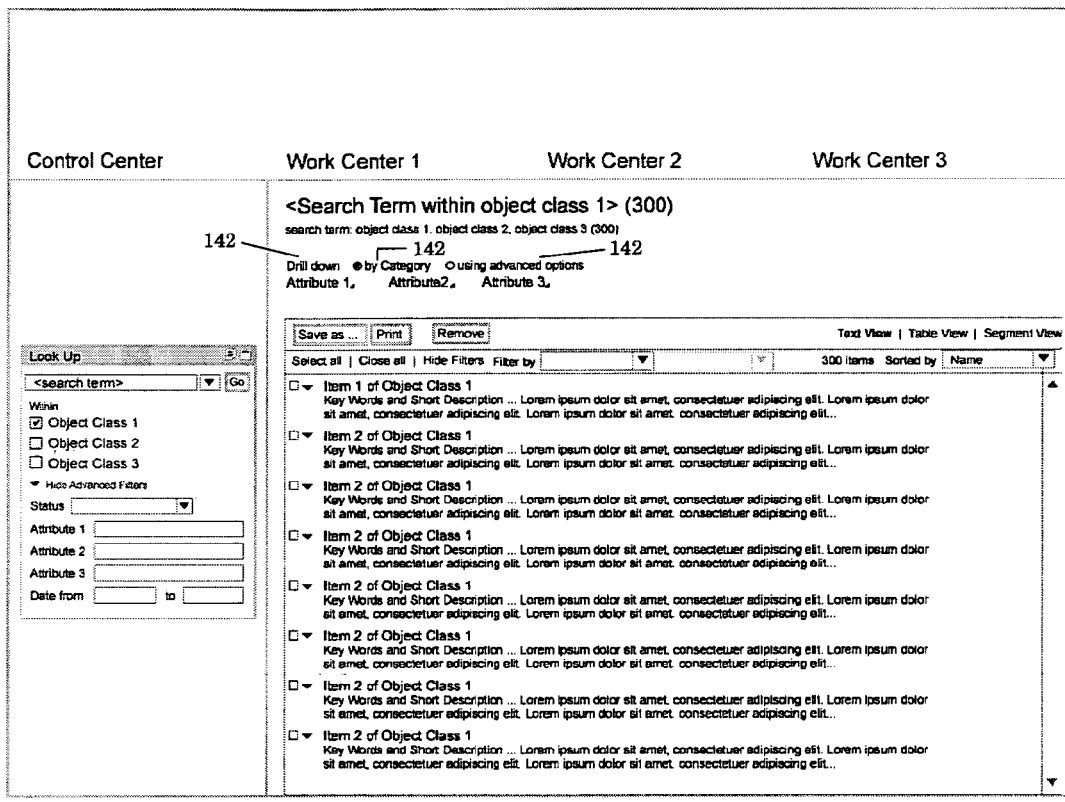

FIG. 8 illustrates a text view showing the filters 142 in a function bar 143.

Figure 9:
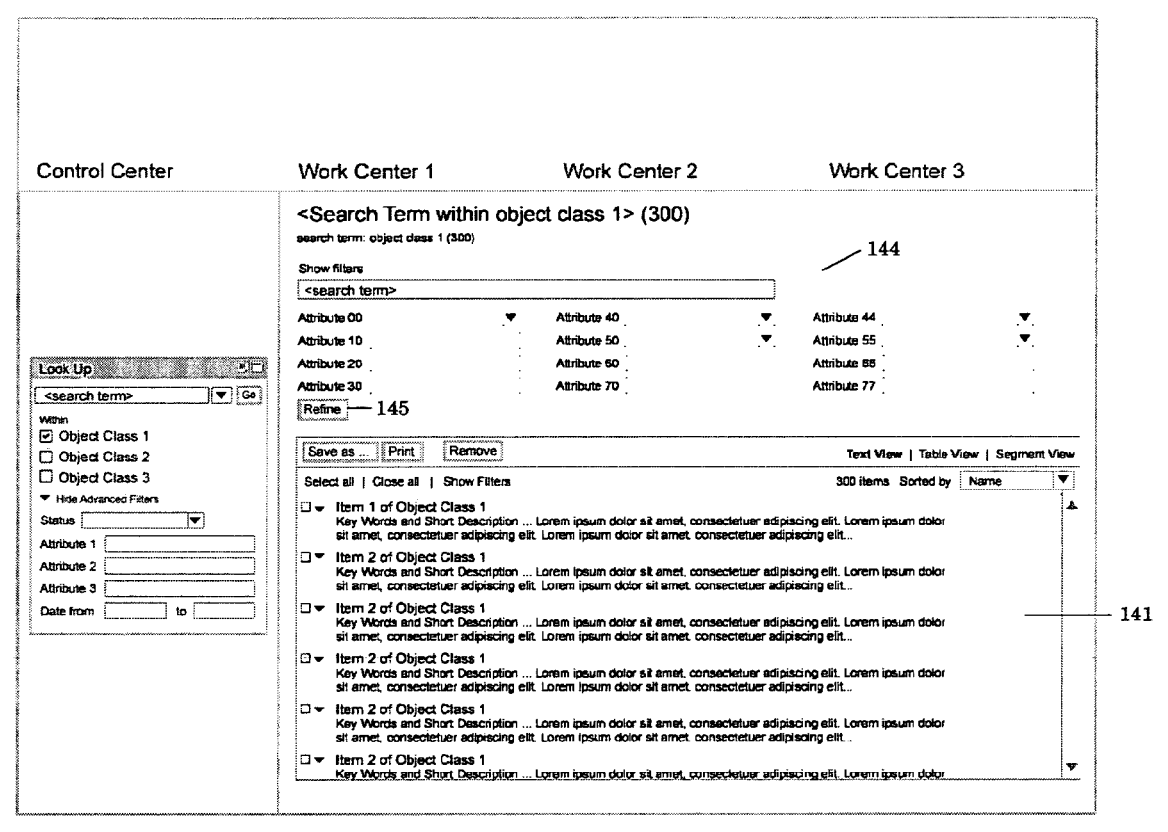

FIG. 9 illustrates search results 141 in text with the advanced options 144 displayed. Clicking the "Refine" button 145 triggers the refinement of the list 141.

Figure 10:
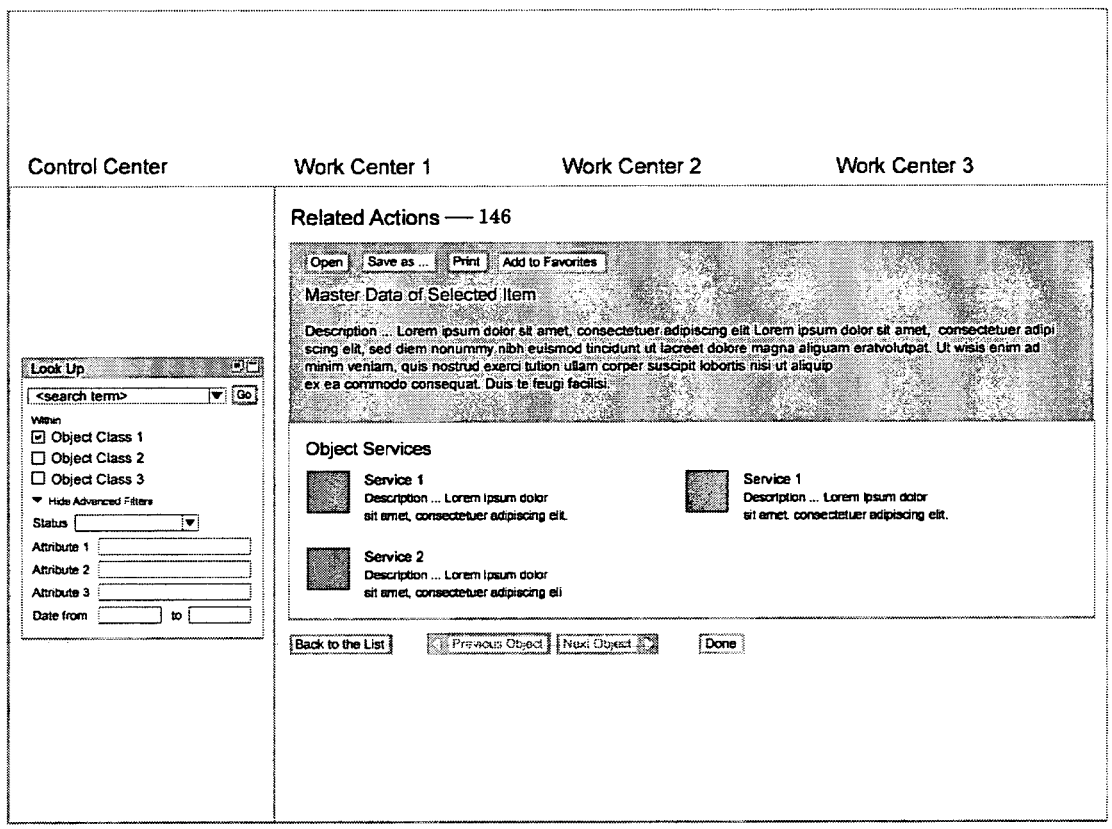

FIG. 10 illustrates viewing the details and related actions 146 of an item by clicking the "Related Actions" button 146.

Figure 11:
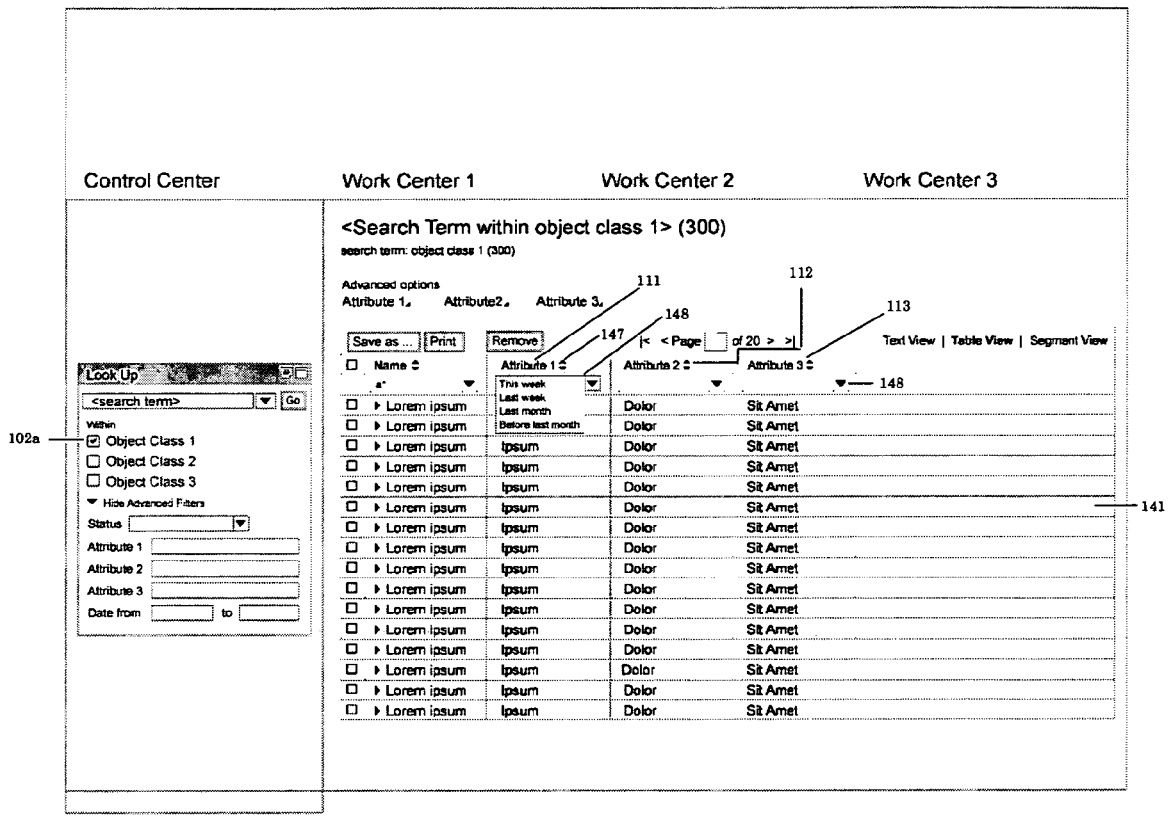

FIG. 11 illustrates search results 141 of one object class 102a viewed as a table. Sorting (up/down) is done using the table headers 147. The filter row 148 allows to either enter a value for that attribute 111, 112, 113, or to select one from a drop down list 148. The filter row 148 is preferably visible or invisible on user demand.

Figure 12:
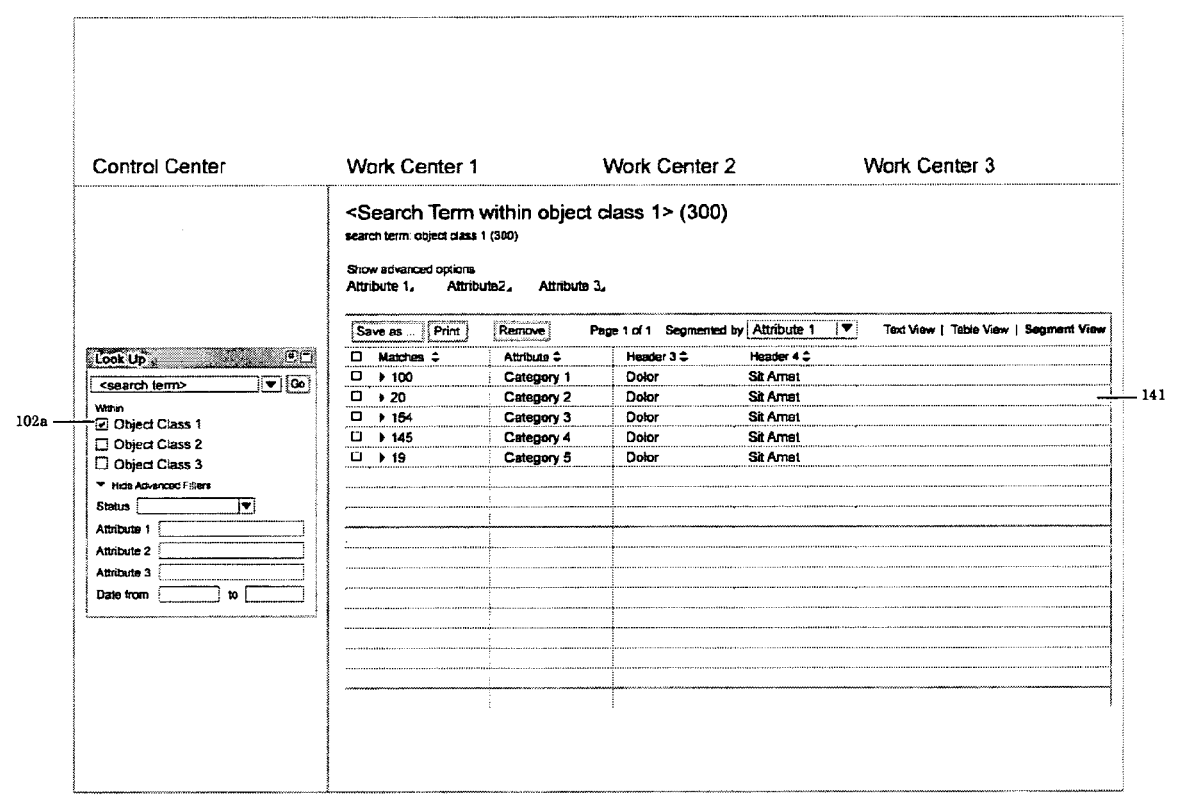

FIG. 12 illustrates search results 141 of one object 102a in segment view.

Figure 13:
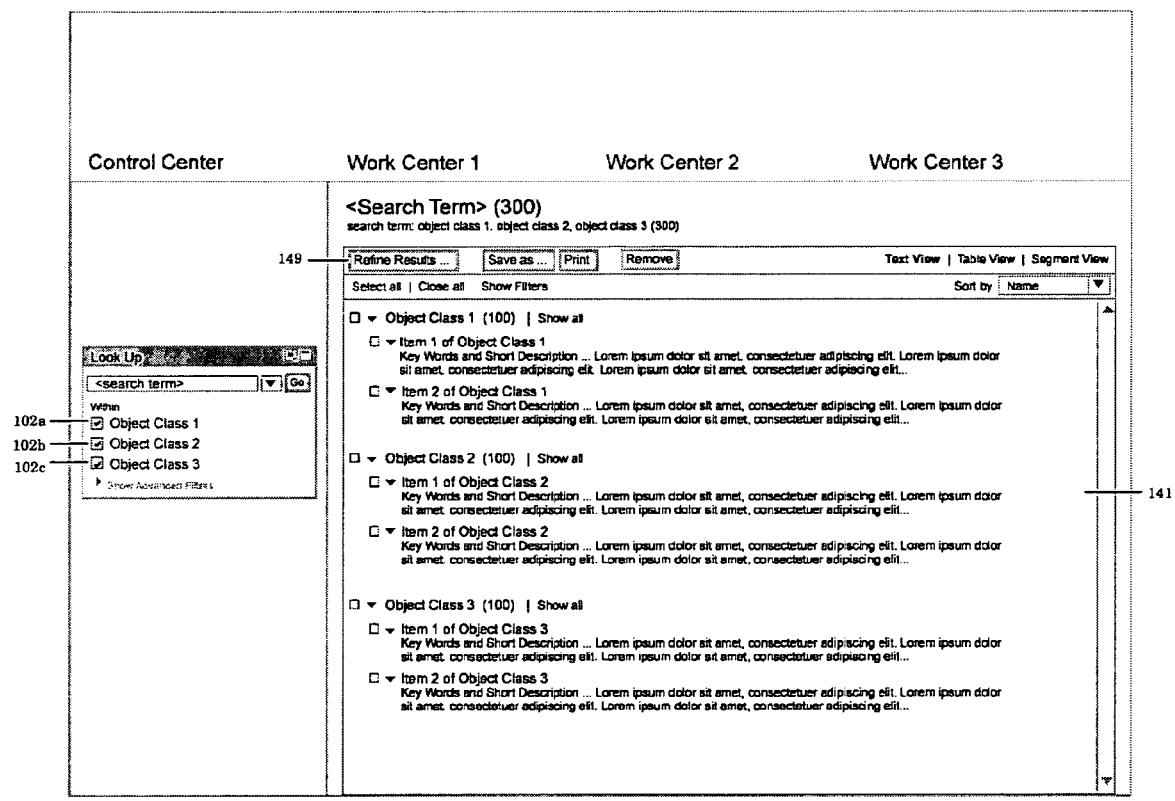

FIG. 13 illustrates search results 141 of searching across a plurality of object classes 102a, 102b, and 102c in text view. Whether or not the object classes are opened, and how much they display of their contained items is dependent on the amount of space available. If there are several object classes, they may be displayed with a closed norgy, giving limited information, for example, only aggregated information, e.g. the number of items contained. If there are relatively few object classes, then a number of items contained are displayed to give the user a better idea of the kind of items contained per class. Additionally there is the option to "Show all" items of a class on demand. If all returned items fit the space, all object classes are displayed with an open norgy.

If a result list of a plurality of object classes 102a, 102b, and 102c needs to be refined, it is done by selecting an object class 102a and clicking the "Refine Results . . . " button 149. If one individual item is selected in conjunction with the "Refine Results . . . " button 149, the refinement dialog for that object class is opened, as described in the following example. The refine action prompts a refinement dialog, after clicking the "Refine Results . . . " button. Typically, only one object class can be refined at one time. The refinement action makes the dynamically generated filters, as well as the advanced options available for refinement.

Figure 14:
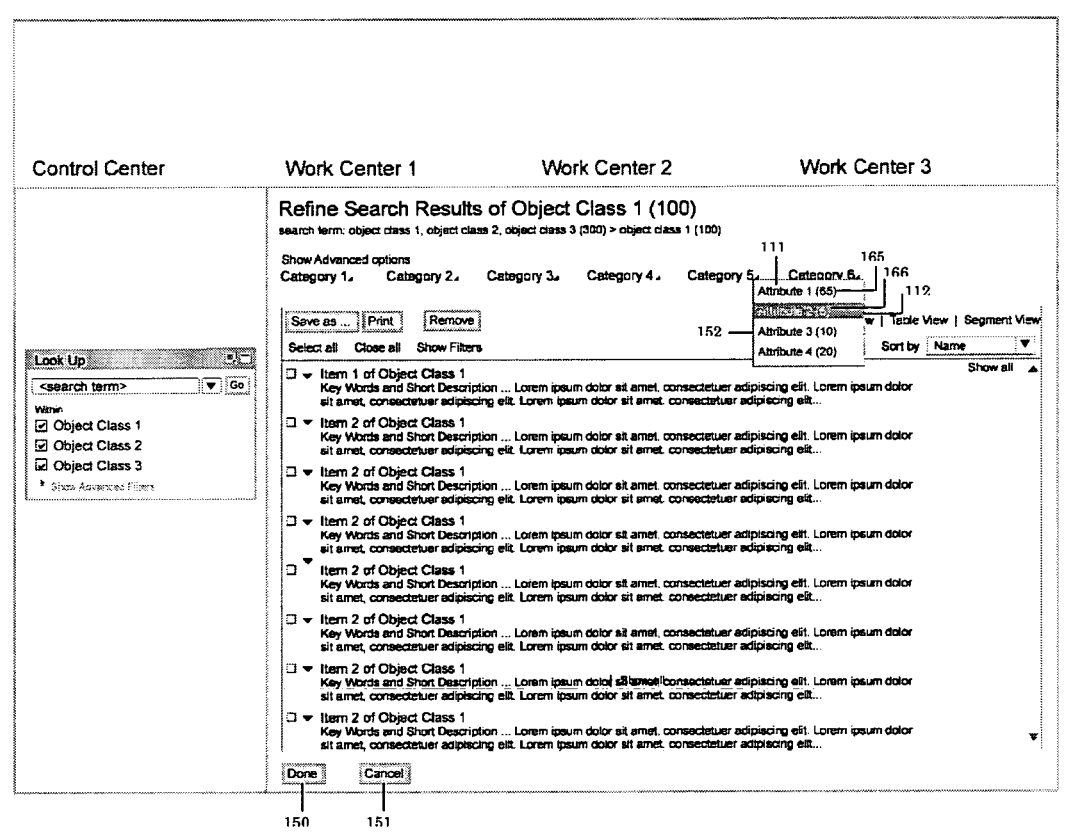

FIG. 14 illustrates how cutting the search result list 141 based on a selected attribute 112 is done using the "Refine" button 149. As many refinement rounds as necessary can be done. Once the user has achieved the desired result s/he can click the "Done" button 150 to return to the previous list—minus the items that have been cut away during refinement. If the user selects more than one object class 102a, 102b, 102c (in the previous screen) before hitting the "Refine Results . . . " button 149, the refinement user interface for each object class 102a, 102b, 102c is stacked on top of each other. This means after hitting the "done" or "cancel" button 150, 151 the refinement dialog for the next object class is displayed. In a further embodiment, "Refine Next", "Done" and "Cancel" buttons may be provided if the user refines object class 1 of n, for example. Further, "Refine previous", "Refine Next", "Done" and "Cancel" buttons may be provided if the user is refining object class 2 of n, for example, where n refers to the number of object classes. Further, "Cancel" and "Done" completes the refinement action and brings the user back to the mixed object class result list. "Cancel" cancels the refinement action and brings the user back to the mixed object class result list. The buttons may be provided as "Refine Next".

Figure 15:
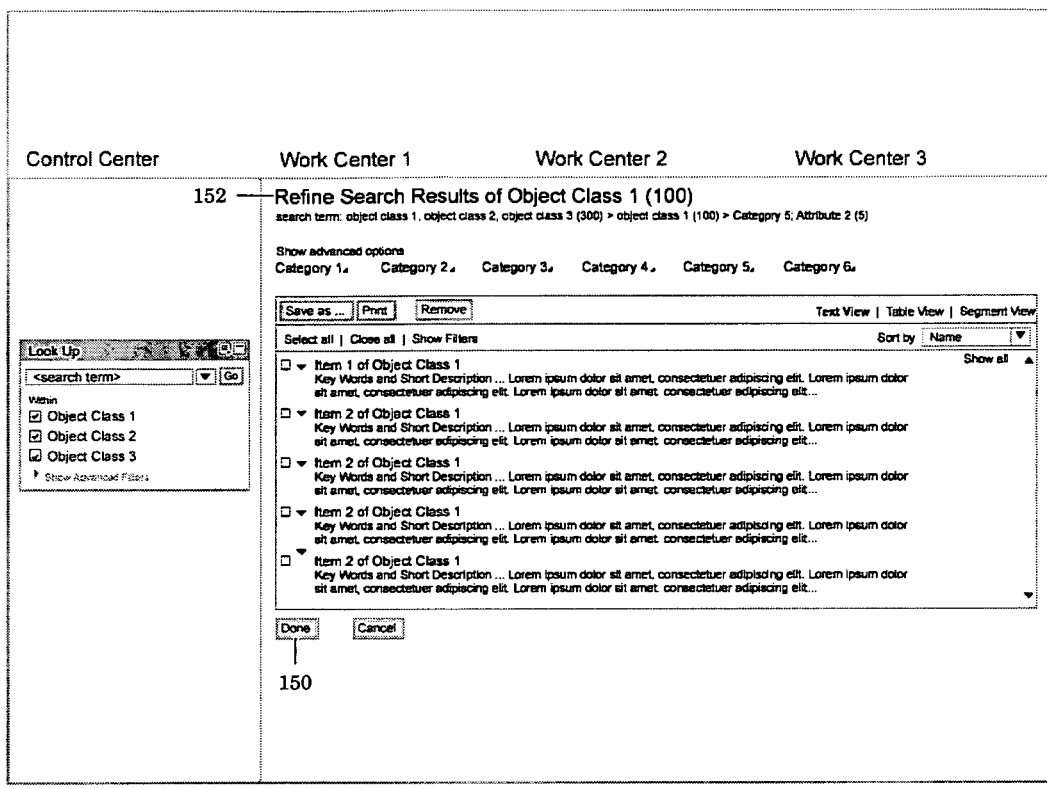

FIG. 15 illustrates the refinement of Object Class 1 152.

Figure 16:
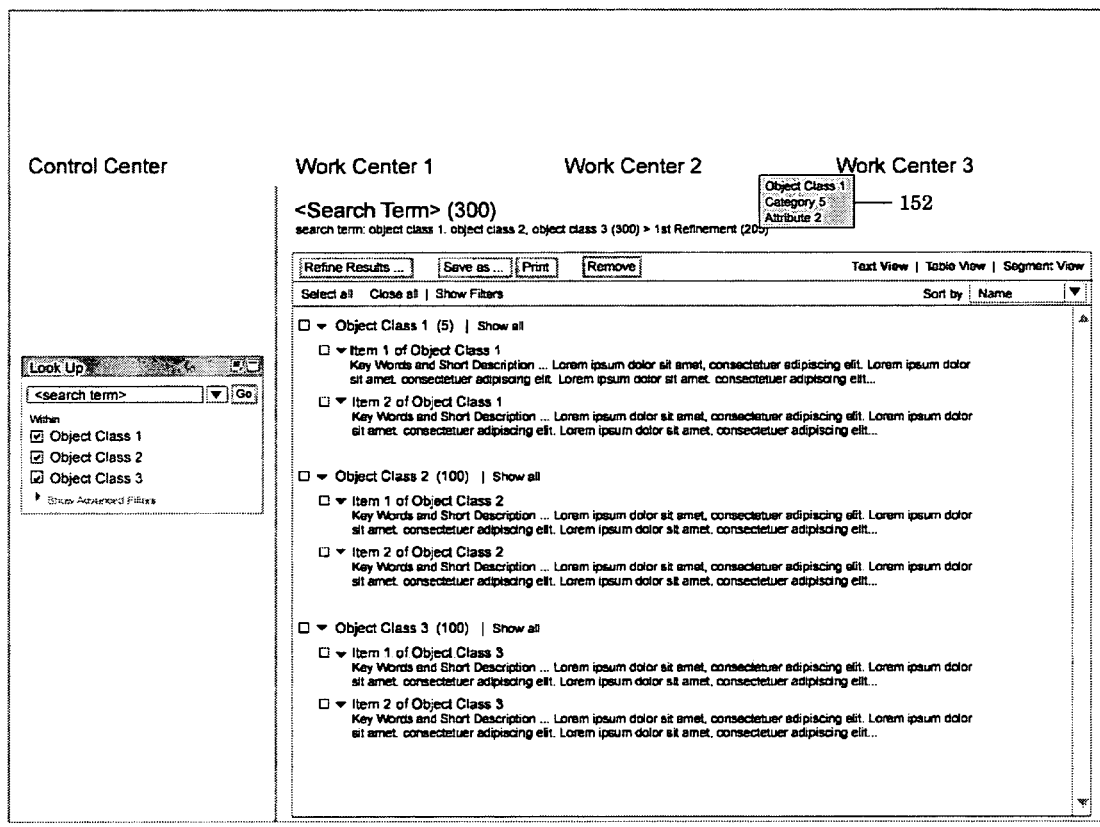

FIG. 16 illustrates that once returned to the previous list (after clicking the "Done" button 150), the breadcrumb 152 reflects that there has been a refinement done, as well as it shows the total number of items left in the entire result list. On roll over the breadcrumb entry details of the refinement are revealed.

Hereinbelow, preferable elements of the look up action are described in further detail.

Search Results: Displays search results 141 and allows to refine using guided navigation or advanced options 107.

Favorites: Shows the favorites of an object class 102 as a default when clicking on the object class link name in the contextual panel search component 100, or when the user clicks on the tab. Clicking on an object class brings up the list one object class.

Recent: Shows the instances of one or more object classes 102 that have been used recently by the user. The definition of what is considered "recent" can be personalized by the user.

Collections: Allow to browse though all object classes 102 and media types of a particular Work Center 131, 132, 133.

Did you mean: The "Did you mean: < . . . >" feature proposes a corrected spelling if the user made a typing mistake. The result list 141 shows whatever result is yielded by the user's actual spelling of the search term. By clicking on the proposed spelling of "Did you mean: <proposed spelling>" the user can display a new search result list using the corrected search term. If the search term is spelled correctly in the first place "Did you mean:< . . . >" does not appear on screen.

Page Title: The title of the Look Up action is shown as "Search Result for <search term (#)>".

Breadcrumb: The Breadcrumb 152 is located below the page title. Each refinement adds another entry to the breadcrumb. The entries prior to the ones currently viewed are displayed as hyperlink and are used to navigate back to previous result lists. The breadcrumb also contains the number of items per refinement. This number is indicated in brackets.

When refining multiple object classes the breadcrumb gets updated after each object class' refinement, displaying the object class's refinement in a generic way. On roll over (e.g. "Object Class 2 refined") its details (selected attributes) are displayed.

Search Result Format Switches may be achieved in the following way: depending on the object class 102 or media type, the numbers of returns yielded, or the user's intent, different formats of viewing 153, 154, 155 the list are available. The format may be switched by clicking on the viewing links 153, 154, 155.

Tool Bar 156: The tool bar 156 contains buttons 157, 158, 159, as well as the view links 153, 154, 155 to change the format of the search result list. If the results are displayed in table view the tool bar 156 also contains the paginator.

The buttons included on the toolbar 156 may include: "Save as . . . " Button 157: The Search result list can be saved as temporary search results, a dynamic list (query), or as a static list. If the contextual panel 100 contains a "Favorites" component the "Save as . . . " dialog 157 also allows to save items or the whole list as a link into the "Favorites" component. In one embodiment, the buttons 157, 158, 159 are right aligned in the tool bar 156. Further, to switching search result formats, the view links 153, 154, 155 to switch the format of the search results may be left aligned in the tool bar 156.

Paginator: When in table view 154 the tool bar 156 additionally contains a paginator. The paginator allows paging to the top, or the end of the lists, or forward or backwards per page; it also indicates the total number of pages in the result list, and allows entering a specific page name to jumpto.

Related Actions: When clicking the "Related Actions" button 146 in FIG. 10 the selected object(s) are being displayed in more detail than the text or table views offer, along with all actions applicable to an object without opening the object itself.

Function Bar 160: the function bar 160 is typically below the tool bar 156 and above the list 141 or table 141. It contains the functions "select all" 161, "deselect all", "open/close all" 162, and "show filters" 163, which are preferably left aligned. The mechanism to sort text formatted lists is also located in the function bar 160. The default sorting criteria is "Name" 164; however this might be personalized by the user.

Select All/Deselect All 161: This function Select/Deselects all items in a list. This function toggles to always only display the option that makes most sense. If the number of items selected is less than 50% the function is set to "Select all" and vice versa.

Close All/Open All 162: This function is available for hierarchical result lists and opens/closes all nodes. If the number of nodes opened is less than 50% the function is set to "open all" and vice versa.

Show/Hide Filters 163: In text view mode 153, if the "show filters" 163 is selected it toggles to display "hide filters", as well as it adds a double drop down menu with filter options 107 to the function bar 160. The first drop down contains the first set of attributes by which the results can be filtered. Once on attribute is selected, the second drop down is being filled by the system and contains the categories of the selected attribute. The cutting of the list is executed either on selection of a category, or upon button click.

Sorting 164: A sorting function 164 is available in any result list. However, only in text formatted view 153 this mechanism is located in the function bar 160, preferably right aligned.

When in table view 154, there is no function bar 160 below the tool bar 156, as those functions are part of the table. Sorting up/down is done by clicking on the table columns' headers or icons. To filter the results in table view 154, the filter row allows to either entering discrete values, or to select from the entries of the entry filed/drop down combination box.

The search results formats are now described in further detail.

The text formatted view 153: this format is most suitable for displaying lists of media types. Additionally the items name shows a description e.g. the items main data, media type, creation date, creator, etc., as well as a preview or key words of its content. The Text format 153 is not restricted to displaying lists of media types, but can also be used for displaying search results of searches for business objects.

When the result list contains multiple object classes, the text formatted view displays the hierarchy (object classes>their instances). Depending on the number of search results returned, the object classes are displayed as closed or open hierarchy. In open state—again, depending on the number of search results—a number of instances are displayed to give an idea of what kind of results are contained in a given object class. The object class level displays the object class' name, the number of returns of this class, and a "Show all"-function, if not all of the items can be displayed. For the text formatted view a further row control may be provided. The row control allows displaying texts of different formats in one row.

The table formatted view 154: the table view 154 shows the results formatted using the main attributes as the table's columns. When refining the original search result list, additional columns are added to the table. Sorting the table by clicking on the column header or icon is possible. Additionally there are filters for each column by which the list can be refined. The filters may be hidden on user demand. Further, each table row may be expanded to show details about the item as a pop-in. When searching across a plurality of object classes 102 the table groups the results per object class. The groupings can be opened and closed by the user. When closed, the object class' row displays aggregated information about the items it contains, like the number of items and the percentage of yields compared to the number of the entire list.

When the groupings are opened the filter row per object class, as well as the items contained in the group, are displayed. For opening and closing the object classes the same rules apply as when displaying multiple object class search results in text view.

Segment formatted view 155: in the segment view 155, the user may view the search results as segments, wherein the items are grouped based on one of the attributes. Each group occupies a row showing aggregated information to each of the tables' columns. Additionally a visualization of the segment's weighting, in relationship to the over all result, is shown. When opening a group its items are displayed.

The search refinement is now described in further detail. The search refinement is performed within one object class. Therefore these options are only displayed, if the search result list contains only objects of the same class. When having a result list of a plurality of object classes the refinement can be triggered by selecting one or multiple object classes and clicking the "Refine Results . . . " button 145. This stacks the refinement action on top of the initial search result list 141. When having selected a plurality of object classes the refinement is done one object class at the time. Clicking the "done" 150 or "Cancel" button 151, either applies the refinement to the initial list, or disregards it and returns to the initial list. In case of a plurality of object classes the "Done" 150 or "Cancel" buttons 151 brings up the refinement screen for the next selected object class.

Using Dynamic Filter List is now described in further detail. The dynamically generated filters/guided navigation is displayed independent of the format the result list is being viewed in. The highest level attributes are listed in a horizontal row. Clicking one attribute displays the sub-attributes in another row below. Clicking on one of these sub-attributes refines the search result list and causes the refining attribute to extend the breadcrumb with a new entry. At the same time another set of attributes is being generated and displayed.

The attributes 111, 112 shown include a number in brackets 166 (refer to FIG. 14), indicating the number of items from the existing list, which match the attribute 111, 112. This gives the user an idea of how his/her search results are distributed across the attributes.

With respect to the advanced options: only one of the refinement options can be chosen at a given time, either the guided navigation or the advanced options. The Guided Navigation is the default selection. Using the advanced options mechanism, the user can enter specific values into input fields or select from pre-defined values. In comparison to the Guided Navigation, the advanced option allow the user to immediately enter a specific value, rather than drilling down into the dynamic filter categories, or to select ranges spanning multiple dynamically proposed values.

With respect to initialization and data population of the search service, the lookup action is typically launched from the search component from the Contextual Panel 100 and must be able to receive data from the Contextual Panel Component. The look up action may further restrict search to selected object classes or other filter settings and may populate text argument as search criteria. If a generic context framework is in place, this action may be context aware in the sense that search range, recent, favorites are derived from the currently active context.

Further sub-components may include: a search and refinement section. The search and refinement section provides the user interface to enter search criteria. The user interface may be personalized with respect to what criteria can be entered. It further supports new search, add to search, or refine search. Further it may set/switch specific object type. Further it may be expandable/collapsible to hide advanced options if not needed or if all settings have been populated into the LookUp Actions from the calling context.

A further sub-component may be a refinement dialog. The refinement dialog may provide a standard sub-screens depending on object/attribute type. It may further provide a topic picker for controlled vocabularies/Taxonomies. In addition, it may provide a particular user interface for date, people, documents, etc.

A further sub-component is a result list 141. The result list may support different views, such as, free text format 153, table format 154, and segment view 155. Further it may include a sorting function 164 and further a single or multiple selection of items. Other features of the result list may include clicking on item name to open the item, a Save As function 157 to save match list, other follow up actions that take match list as input and browsing directories. A further subcomponent is a search history display. This component displays history of search. It may further add any items that have been inspected in detail to the candidate list. It may also support backward navigation to previous search state. It may further support a single or multiple selection of items.

A yet further sub-component is a recent tab. The recent tab provides an optional additional list with items recently touched by the user (create, edit, view). A further sub-component is a favorites tab. The favorites tab provides a list of favorites, created by the user. A further sub-component is a collections tab. The collections tab is for browsing a collection. Further, <Personalized Tabs> may be provided. The personalized tabs provide additional collections created by the user using the Save AS function.

A configuration parameter may include formats to view search result list, tabs and advanced options.

In an embodiment, at least one search and look up template is, respectively, associated with the corresponding specific instance of work to be executed in the predetermined number of work-roles by executing at least one corresponding search and look up action through the search or look up service on the data objects. In a further embodiment, each work context is arranged for providing the data interface to the data objects so as to instantiate the at least one corresponding search and look up action by populating said at least one search and lookup action with data interfaced from said data objects.

It should be noted that the above-mentioned embodiments illustrate rather than limit the invention, and that those skilled in the art will be able to design alternatives without departing from the scope of the appended claims. For example, the computational aspects described here can be implemented in digital electronic circuitry, or in computer hardware, firmware, software, or in combinations of them. Where appropriate, aspects of these systems and techniques can be implemented in a computer program product tangibly embodied in a machine-readable storage device for execution by a programmable processor, and method steps can be performed by a programmable processor executing a program of instructions to perform functions by operating on input data and generating output. The mere fact that certain measures are recited in mutually different claims does not indicate that a combination of these measures cannot be used to advantage.

The invention claimed is:

1. A computer implemented method comprising:
   determining an instantiated context of user activity in a computer system supporting user activity in a plurality of contexts, the instantiated context of user activity initiated by a user of the computer system related to an application designed with objects and media types and unrelated to searching the computer system;
   generating a user interface solely based on the instantiated context of user activity, the user interface presenting to the user of the computer system guided navigation prompts for searching the computer system, the guided navigation prompts based on the instantiated context of user activity;
   receiving user responses to the guided navigation prompts for searching the computer system;
   generating a query from the user responses to the guided navigation prompts for searching the computer system; and
   executing a contextual search via the user interface based on the generated query, the contextual search restricting a scope of searching the computer system in accordance with the generated query, wherein the scope to which the contextual search is restricted are the objects and media types with which the application was designed, the objects including business objects grouped in object classes, the user interface presenting to the user of the computer system guided navigation prompts to select which object classes the user is interested in searching, including displaying one or more favorite object classes based on previous user interaction with the user interface.

2. The method of claim 1, wherein the generated query is a search term, the search term based on the user responses to the guided navigation prompts for searching the computer system.

3. A computer readable storage medium storing a program which when run on a computer controls the computer to perform a method comprising:
   determining an instantiated context of user activity in a computer system supporting user activity in a plurality of contexts, the instantiated context of user activity initiated by a user of the computer system related to an application designed with objects and media types and unrelated to searching the computer system;
   generating a user interface solely based on the instantiated context of user activity, the user interface presenting to the user of the computer system guided navigation prompts for searching the computer system, the guided navigation prompts based on the instantiated context of user activity;
   receiving user responses to the guided navigation prompts for searching the computer system;
   generating a query from the user responses to the guided navigation prompts for searching the computer system; and
   executing a contextual search via the user interface based on the generated query, the contextual search restricting a scope of searching the computer system in accordance with the generated query, wherein the scope to which the contextual search is restricted are the objects and media types with which the application was designed, the objects including business objects grouped in object classes, the user interface presenting to the user of the computer system guided navigation prompts to select which object classes the user is interested in searching, including displaying one or more favorite object classes based on previous user interaction with the user interface.

4. A computer readable storage medium according to claim 3, wherein the generated query is a search term, the search term based on the user responses to the guided navigation prompts for searching the computer system.

* * * * *